Nov. 8, 1949     J. FINN     2,487,229
WAVE AND CURRENT OPERATED DRAG
Filed Aug. 27, 1948
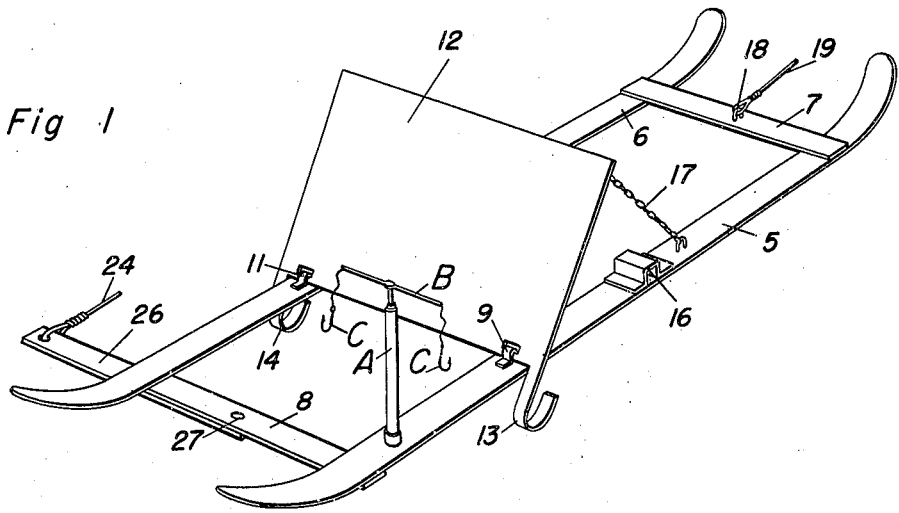
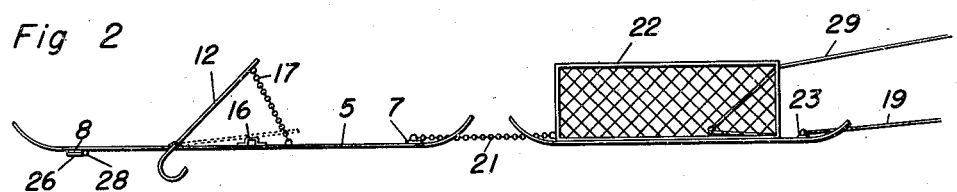
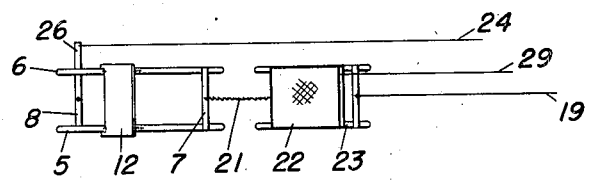
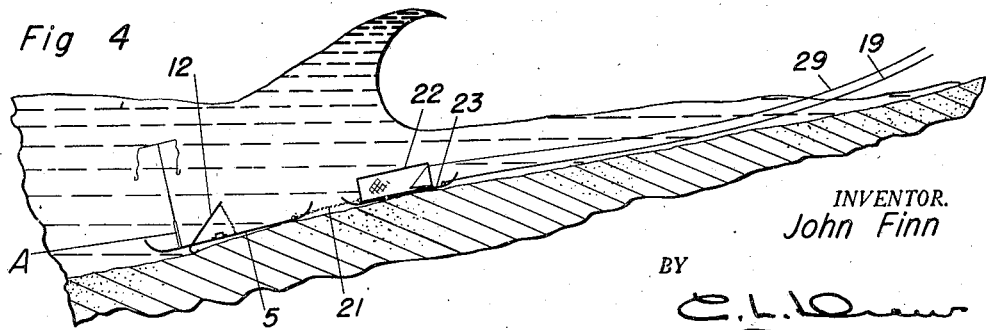
INVENTOR.
John Finn
BY
Att'y Patented Nov. 8, 1949

2,487,229

UNITED STATES PATENT OFFICE 2,487,229

WAVE AND CURRENT OPERATED DRAG

John Finn, San Francisco, Calif.

Application August 27, 1948, Serial No. 46,439

1 Claim. (Cl. 43—4)

This invention relates to improvements in wave and current operated drags.

The principal object of this invention is to provide means for dragging a fishing line, crab net or any other object, such as a mine, outwardly away from the shore line and to control the movement of the drag as to the direction of movement.

A further object is to produce a device which is readily transportable, light in weight, and one which is not subject to damage.

A further object is to produce a device which has the ability to lift itself over slight obstructions through the utilization of a lifting action.

Other objects and advantages will be apparent during the course of the following description.

In the accompanying drawings forming a part of this specification and in which like numerals are employed to designate like parts throughout the same, Fig. 1 is a perspective view of my current operated drag, Fig. 2 is a side elevation of my drag on a reduced scale and showing a crab net attached thereto, Fig. 3 is a top-plan view of Fig. 1, on a reduced scale, showing the guide line, and Fig. 4 is a side elevation of Fig. 3 showing the manner in which the drag follows the submerged beach.

In fishing, particularly surf fishing, it is necessary to cast in such a manner that the hook on the line will be thrown a considerable distance from the shore line so as to enter the water at a point beyond the breakers where the larger fish are feeding. This is often very difficult to accomplish and many fishermen wade into the water a considerable distance in order to achieve a longer cast.

Applicant has devised a drag to which a fishing line or fish hook may be attached, which drag will be operated by the action of the waves or the current (and from here on the word, "current," will be assumed to refer to any fluid force which actuates the drag, as, for instance, the current in a stream or at the seashore where there is the breaking of the waves that cause an undertow or backward flow of the water). This current will cause my drag to move outwardly or away from the operator to any desired distance as long as the current exists. Thus, the user could attach to the drag a fish line or fish hooks arranged thereon or could attach thereto a fish trap or crab trap and by manipulating a controlling or guide line, this fishing equipment will be dragged outwardly away from the operator in any controlled direction where there is a current.

Referring to the accompanying drawings, wherein, for the purpose of illustration, is shown a preferred embodiment of my invention, the numerals 5 and 6 refer to supporting surfaces preferably formed as skids connected by cross pieces 7 and 8.

Pivoted to the skids 5 and 6, as shown at 9 and 11 respectively, is a plate 12, which plate has extensions 13 and 14, which are bent upon themselves so as to form upturned ends or rockers, the purpose of which will be later seen.

Positioned on the skids are spaced lugs 16, against which the plate 12, rests when in the dotted-line position of Fig. 2.

Chains 17, restrict the pivotal movement of the plate 12, away from the lugs 16.

In order to control the movement of my drag I provide an eye 18, to which a drag line 19, is attached. This eye can also serve to attach through the medium of a yoke 21, a crab net 22, mounted upon skids 23.

A line 24, attached to a link 26, pivoted as at 27 to the cross piece 8, may be used for turning the drag around and hauling it back on shore.

A pin 28, prevents backward movement of the link 26, during the initial pulling and turning the drag about.

At A I have shown a standard which may be a telescoping standard if desired, the top of which may support a cross piece B, and fish hooks C.

Any means may be employed for closing the door in the crab trap, as, for instance, a line 29.

Assuming that one of my devices is to be used, the user places the same in the water adjacent the shore, as, for instance, at a beach where there is wave action and attaches thereto any desired equipment which he may wish to propel outwardly away from the shore with the result that, as the breakers break over the device, the back wash or undertow will flow beneath the back of the plate 12 as it lies in the dotted-line position of Fig. 2, and will cause the plate to raise and move the entire device forward along the bottom or submerged beach. The rockers 13, will effect a walking action and will tend to raise the front ends of the skids 5 and 6, over any small obstructions, such as small rocks in the path of movement.

It has been found, from experience, that the wave action on an 8" x 10" plate is sufficient to drag an ordinary crab trap and if the shore is sandy the rocker arms will merely drag through the sand and not be impeded thereby.

If the device is used in a stream it is only necessary to introduce the device at a point where the current of the stream will engage the back surface of the plate so as to receive power from the moving water to propel it on its way.

By maintaining a tension on the line 19, and by walking to either the right or the left, depending upon the direction that the waves are approaching the shore, movement of the device can be controlled so that it will move away from the shore in any desired direction. It is seldom that the waves ever hit the shore straight on. Therefore, there is always a movement to one side or the other and by taking advantage of this movement through control of the line, the advances may be directed wherever the user so wishes.

When it is desired to retrieve the device, by pulling upon the line 24, the same will be turned about and, as soon as the same is headed toward shore, the link 26, will extend directly outwardly therefrom so as to produce a straight-line pull on the pivot 27.

It will thus be seen that I have produced a drag which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A current-operated submarine drag comprising a supporting structure, a plate pivoted to said supporting structure, means for limiting the pivotal action of said plate in relation to said supporting structure, and lugs interposed between said plate and said supporting structure for supporting said plate in inoperative position, said plate having extensions formed thereon, and said extensions being bent upon themselves to form rockers at a point beneath said supporting structure.

JOHN FINN.

REFERENCES CITED

The following references are of record in the file of this patent:

UNITED STATES PATENTS

| Number | Name | Date |
|---|---|---|
| 1,850,296 | Vermeulen | Mar. 22, 1932 |
| 2,173,511 | Bertelli et al. | Sept. 19, 1939 |